Jan. 6, 1931.  B. WOOD  1,788,265
OIL GAUGE
Filed Oct. 26, 1927
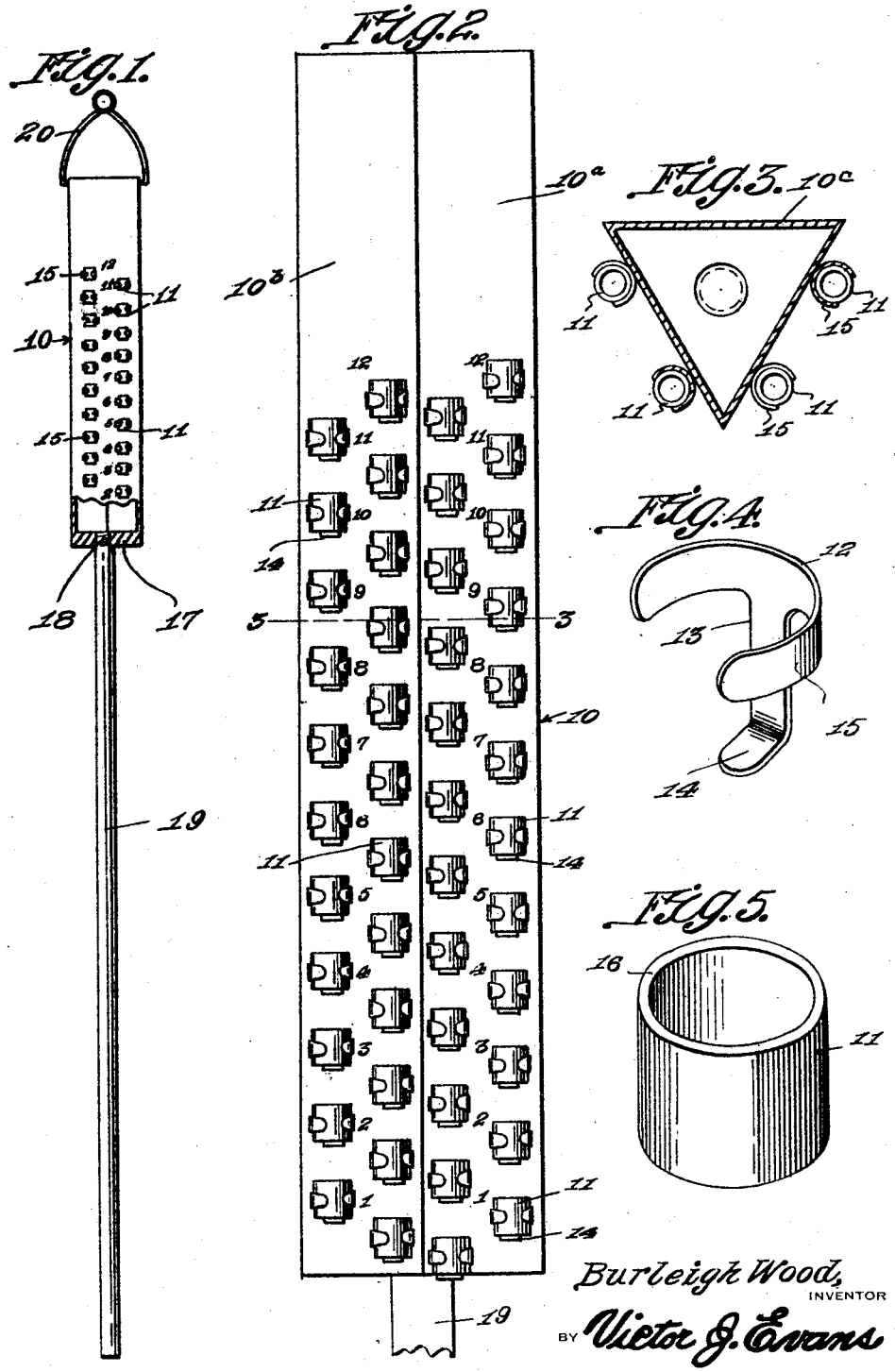
Burleigh Wood, INVENTOR
BY Victor J. Evans
ATTORNEY Patented Jan. 6, 1931

1,788,265

UNITED STATES PATENT OFFICE

BURLEIGH WOOD, OF SEMINOLE, OKLAHOMA

OIL GAUGE

Application filed October 26, 1927. Serial No. 228,961.

The present invention relates to gauge devices of the character known in the oil fields as an oil thief, the purpose of which is to determine the amount of sediment or settlings contained in a crude oil tank, the particular settlings in question being the basic sediments known in the oil fields as "B. S."

Objects of the invention are to provide a gauge which will be simple in its operation and which may give accurate results in the hands of inexperienced persons and which will not fill except as an accurate gauge of the contents of a tank.

Another object is to provide a gauge which will be accurate to a small degree, as a quarter inch, in gauging the depth of sediment in a tank.

A still further object is to provide a construction whereby the cups for catching the liquid may be protected against breakage when the device is not in use.

Other objects and advantages will appear from the following description and will be set forth in the appended claim, and I do not wish to be limited in the scope of my invention except as I shall be limited by said claim.

In the drawings:

Figure 1 is an elevation of a thief in accordance with my invention, showing one face thereof and showing the same mounted on a rod.

Figure 2 is a view of the thief on an enlarged scale compared with Figure 1 and showing two faces of the triangular member with cups mounted thereon for catching the sediment within a tank.

Figure 3 is a section on the line 3—3 of Figure 2.

Figure 4 is a detail view of one of the cup-holding brackets on a still further enlarged scale compared with Figures 2 and 3 and showing the bracket in substantially its true size.

Figure 5 is a detail perspective view of one of the cups to be mounted on said brackets and on the same scale as Figure 4.

Referring to the drawings in detail by reference numerals, it will be noted that the gauge comprises an elongated hollow member 10, triangular in cross section as shown in Figure 3 and having on two of its outer faces a plurality of cups 11, said cups being held to the faces of the member 10 by means of brackets 12 having a vertical portion 13, from the lower end of which extends a horizontal portion 14 to project under the bottom of the cups for supporting the same, and each bracket is provided at its upper end with curved laterally arranged arms 15 adapted to embrace the cylindrical walls 16 of the cups. The bracket may be secured to the walls of the thief in any suitable manner and the cups are arranged on the walls in staggered relation to each other, the upper ends of each cup being on a horizontal line with the bottom of the next cup above it but out of vertical alignment therewith, the alternate cups being in vertical alignment with each other forming two vertical rows of cups on each face, the cups in each row being preferably arranged with their upper ends one inch apart, each cup being approximately a half inch deep. By the arrangement above described it will therefore appear that the cups on one face of the member 10 will be adapted to catch sediment at levels in two rows an inch apart, that is, the cups in the two rows on any one face will be capable of measuring the depth of sediment within a tank accurately to within a half inch of the true depth thereof. The other face may have similar rows of cups, the cups in each row being in staggered relationship to the cups in the other row, and the cups on this face may be so arranged as to be positioned to catch sediment at levels half way between the cups on the other face, that is, considering the cups on the one face as catching sediment on the inch and half inch, the cups on the other face will catch sediment on the quarter and three-quarter levels. The face on which the cups catch sediment on the inch and half inch may be designated by the numeral 10a, and the face on which the cups catch the sediment on the quarter and three-quarter inch levels may be designated by the numeral 10b.

The purpose of making the gauge in the form of a triangular member is to provide a flat surface on the face 10c which may be laid flat on the ground when the thief is not in use, without danger of breaking the cups 11 or filling them with foreign substance.

The thief is preferably open at its upper end and provided with a closure 17 at its lower end, which is provided centrally with a threaded aperture 18 into which may be threaded the upper end of various lengths of rods 19. The advantage of this arrangement is that when gauging the depth of sediment in a tank, say at the end of one month, should the sediment be found at, for instance, a depth of three feet, on the gauging for the next month a length of rod three feet long may be screwed into the end of the thief and merely the difference between the previous reading and the present reading noted on the gauge. In other words, if the cups up to the five inch level should contain sediment, it will be apparent that the depth of such sediment is three feet five inches as compared with three feet at the previous reading. If on a subsequent reading the depth has increased to four feet, a four-foot rod may be attached to the lower end of the thief, and so on. The height of the scale on the thief is preferably one foot long, divided into inch and quarter inch divisions appearing on the two faces on which the cups are located.

The location of the cups exeriorly of the thief instead of on the interior of the walls thereof adapts the device to be reliably used in the hands of an inexperienced person. The arrangement of cups on the interior walls is objectionable, inasmuch as in working the device up and down to get it through the sediment in order to reach the bottom of the tank, the thief will pump itself full and sometimes will overflow, thereby vitiating the test.

The interior of the member 10 may be used as a hydrometer jar. To the upper end of the member may be attached a bail 20 by which the device may be suspended from a cable or the like when being let down to depths beyond the reach of the operator.

Having described my invention, what I claim is:

In a gauge for measuring the depth of sediment in oil tanks, comprising an elongated member triangular in cross section, cups mounted on two of the exterior faces of said tubular member in staggered and regular spaced relation with respect to each other, the cups on one of said faces being so positioned relative to the cups on the other face that they are adapted to gauge levels half way between the cups on the other face, said cup bearing faces being provided with graduations, brackets attached to said faces for supporting and securing the cups to the said faces and each including a vertical portion, a horizontal portion formed with the vertical portion at its lower end, and curved arms laterally extending from the upper end of the vertical portion for embracing a cup, while the horizontal portion engages the bottom of the cup.

In testimony whereof I affix my signature.

BURLEIGH WOOD.